United States Patent
Peterson et al.

(10) Patent No.: US 6,168,671 B1
(45) Date of Patent: Jan. 2, 2001

(54) REAR SCRUB DUAL DRIVE MEANS FOR A SUGAR BEET HARVESTER

(75) Inventors: Gary G. Peterson, Valley City; Michael T. Sprenger, Northwood; Adam R. Menze, Slater; Travis W. Giffey, Cookeville, all of ND (US)

(73) Assignee: Amity Technology, Inc., Fargo, ND (US)

( * ) Notice: Under 35 U.S.C. 154(b), the term of this patent shall be extended for 0 days.

(21) Appl. No.: 09/189,729

(22) Filed: Nov. 10, 1998

(51) Int. Cl.$^7$ ...................................................... B08B 7/00
(52) U.S. Cl. .................................. 134/6; 15/3.17; 15/3.21
(58) Field of Search .................................... 15/3.16, 3.17, 15/3.18, 3.1, 3.13, 3.2, 3.21; 198/419.2, 570, 604, 605, 626.1, 626.2, 626.3; 134/6

(56) References Cited

U.S. PATENT DOCUMENTS

| | | | |
|---|---|---|---|
| 755,937 | * 3/1904 | Richardson et al. | 15/3.21 |
| 2,091,064 | * 8/1937 | Bates | 15/3.21 |
| 2,947,011 | * 8/1960 | McClusky | 15/3.17 |
| 3,102,290 | * 9/1963 | Sannes | 15/3.17 |
| 3,880,274 | * 4/1975 | Bechtloff et al. | 198/605 |
| 4,192,639 | * 3/1980 | Jones, Jr. | 198/605 |
| 5,069,292 | * 12/1991 | Baker et al. | 198/626.3 |
| 5,088,532 | * 2/1992 | Eggers et al. | 198/626.3 |

* cited by examiner

*Primary Examiner*—Randall E. Chin
(74) *Attorney, Agent, or Firm*—Michael S. Neustel

(57) ABSTRACT

A rear scrub dual drive for a sugar beet harvester includes functionally-independent first and second variable speed actuators connected to respective first and second drive shafts of a rear scrub and further includes a fluid supply member, pump, and flow control members for energizing the actuators and controlling the speeds at which they can operate to effectively vary the relative speeds of first and second conveyors which are driven by the respective first and second actuators and which are used to scrub and move the harvested sugar beets. The ability to quickly and conveniently change the speeds of the conveyors on the go without replacing and remounting any parts on the rear scrub on the go allows the user to better match the conditions the user may be presented with while harvesting sugar beets.

6 Claims, 3 Drawing Sheets

REAR SCRUB DUAL DRIVE MEANS FOR A SUGAR BEET HARVESTER

BACKGROUND OF THE INVENTION

1. Field of the Invention

This invention relates to a rear scrub dual drive means for a sugar beet harvester which allows the user to quickly and conveniently change the relative speeds of the independently driven rear scrub chains.

As sugar beets are being harvested they are cleaned and scrubbed by a sugar beet harvester. The sugar beets are picked up by the harvester and first transported upon cleaning rollers and then transported via a conveyor system of two endless conveyors, both of which move vertically and as they do so, the sugar beets are moved vertically between the back run of the first conveyor and the front run of the second conveyor. Both the back run of the first conveyor and the front run of the second conveyor move upwardly, and as they do so the sugar beets are scrubbed upon the spaced elongate member which comprise the conventional belted chain conveyor system.

2. Description of the Prior Art

Generally the two conveyors move at different speeds to effect the scrubbing of the sugar beets. Prior to the present invention, the conveyors were driven by an endless chain carried about drive sprockets mounted to the drive shaft, which rotate the conveyors. One of the conveyors would have either a larger or smaller sprocket than the other conveyor so that the conveyors would move at different speeds to effect the scrubbing process. In order to change the speeds of the conveyors, one or the other of the drive sprockets would have to be removed from the drive shafts and a different sized drive sprocket or sprockets would have be to fastened to the particular drive shaft or shafts. This process is time consuming and costly, because the drive chain in addition to the drive sprocket would need to be taken off and then put back on again.

The present invention eliminates this time consuming and costly process and allows the user to change speeds on the go. The conditions and types of sugar beets may vary even within the same field which may require the user to change the speed of the conveyors to effect the kind of scrubbing necessary at any particular time.

SUMMARY OF THE INVENTION

The present invention relates to a rear scrub dual drive means for a sugar beet harvester which includes a functionally-independent first actuator which is mounted to a conventional first drive shaft and a functionally-independent second actuator which is mounted to a conventional second drive shaft, both of which extend rotatably through and between a pair of conventional spaced-apart walls of the frame of a sugar beet harvester.

The first actuator, when energized, rotates the first drive shaft which rotates a conventional endless first conveyor which is carried about a first drive sprocket mounted to the first drive shaft and further carried about a plurality of first sprockets and first rollers mounted to a plurality of first support shafts, all of which rotatably extend through and between the spaced-apart walls near the front end thereof with the back run of the endless first conveyor moving upward and the front run moving downward.

The second actuator, when energized, rotates the second drive shaft which rotates a conventional endless second conveyor which is carried about a second drive sprocket mounted to the second drive shaft and further carried about a plurality of second sprockets and second rollers mounted to a plurality of second support shafts all of which rotatably extend through and between the spaced-apart walls near the back end thereof with the front run of the endless second conveyor moving upward and the back run moving downward. The sugar beets are scrubbed and moved between the back run of the first conveyor and the front run of the second conveyor.

One objective of the present invention is to provide a rear scrub dual drive means for a sugar beet harvester which allows the user to quickly and conveniently change the speeds at which the conveyors move to effect the best possible scrubbing of the sugar beets.

Another objective of the present invention is to provide a rear scrub dual drive means for a sugar beet harvester which allows the user to adjust the speeds of the conveyers independently of one another without the user having to change the size of the sprockets on the drive shafts.

Yet, another objective of the present invention is to provide a rear scrub dual drive means for a sugar beet harvester which eliminates the user having to take anything apart on the rear scrub in order to effect speed changes in the conveyors.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
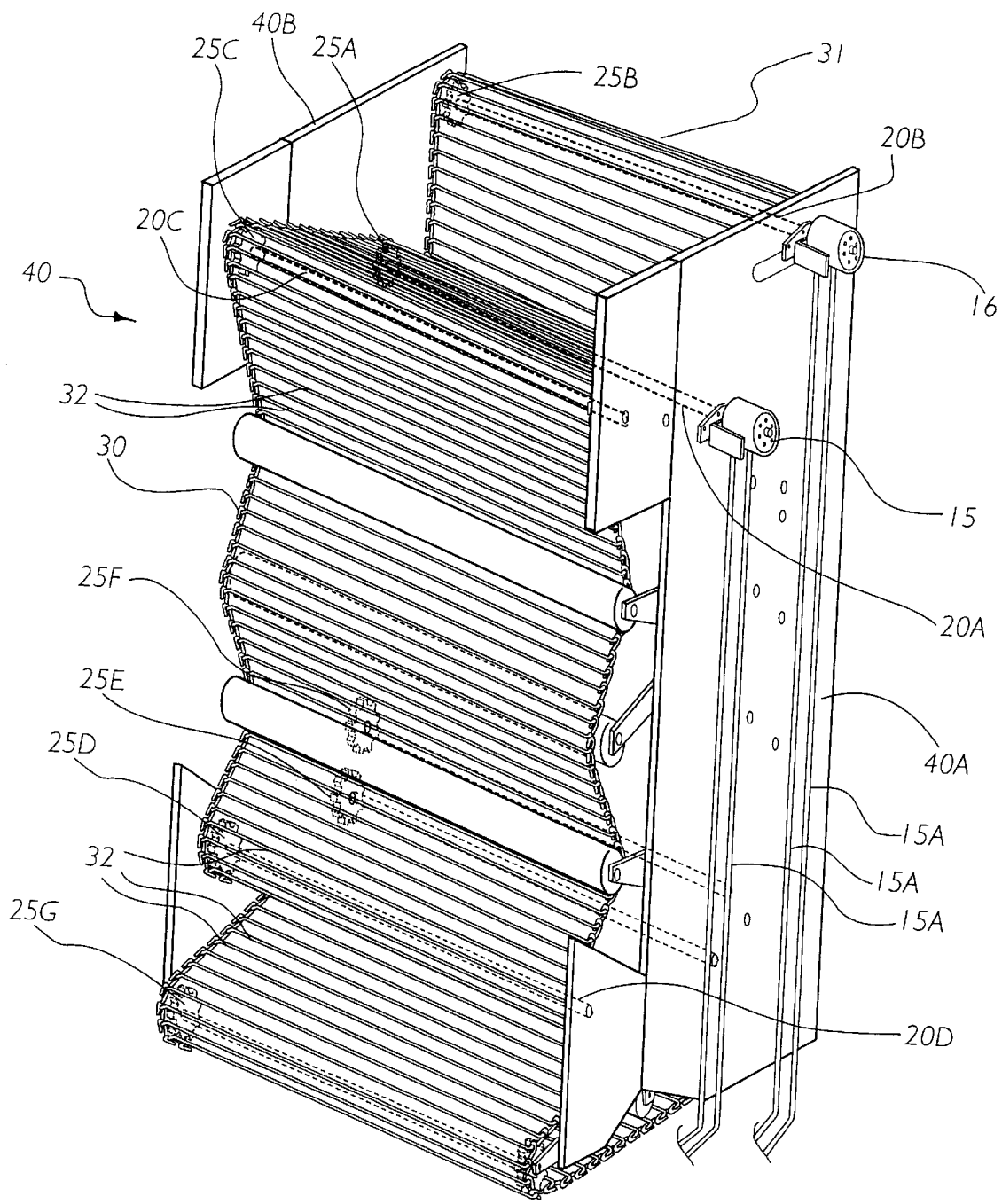
FIG. 1 a perspective view of the rear scrub for a sugar beet harvester.
Figure 2:
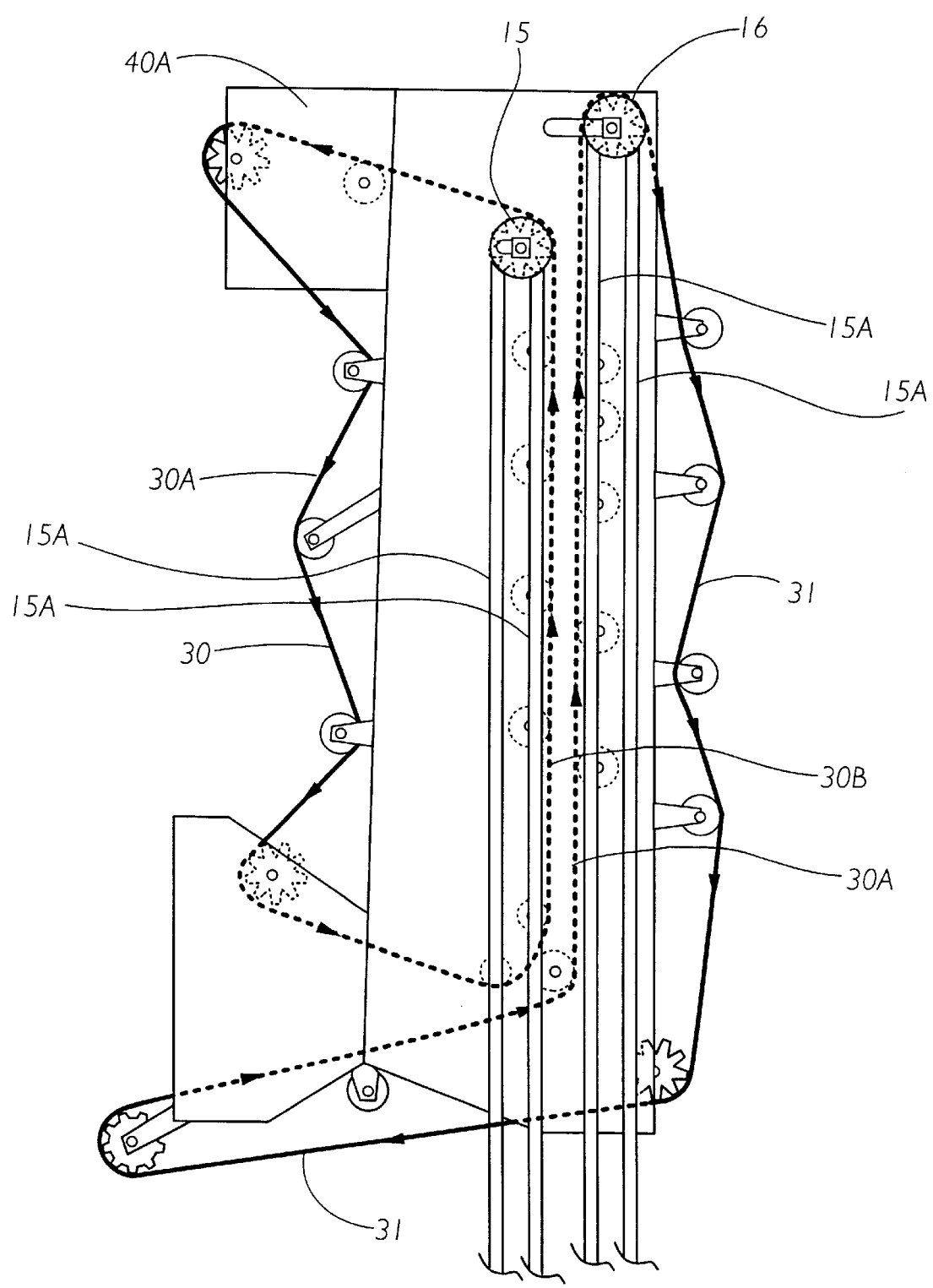
FIG. 2 is a side perspective view of the rear scrub for a sugar beet harvester.
Figure 3:
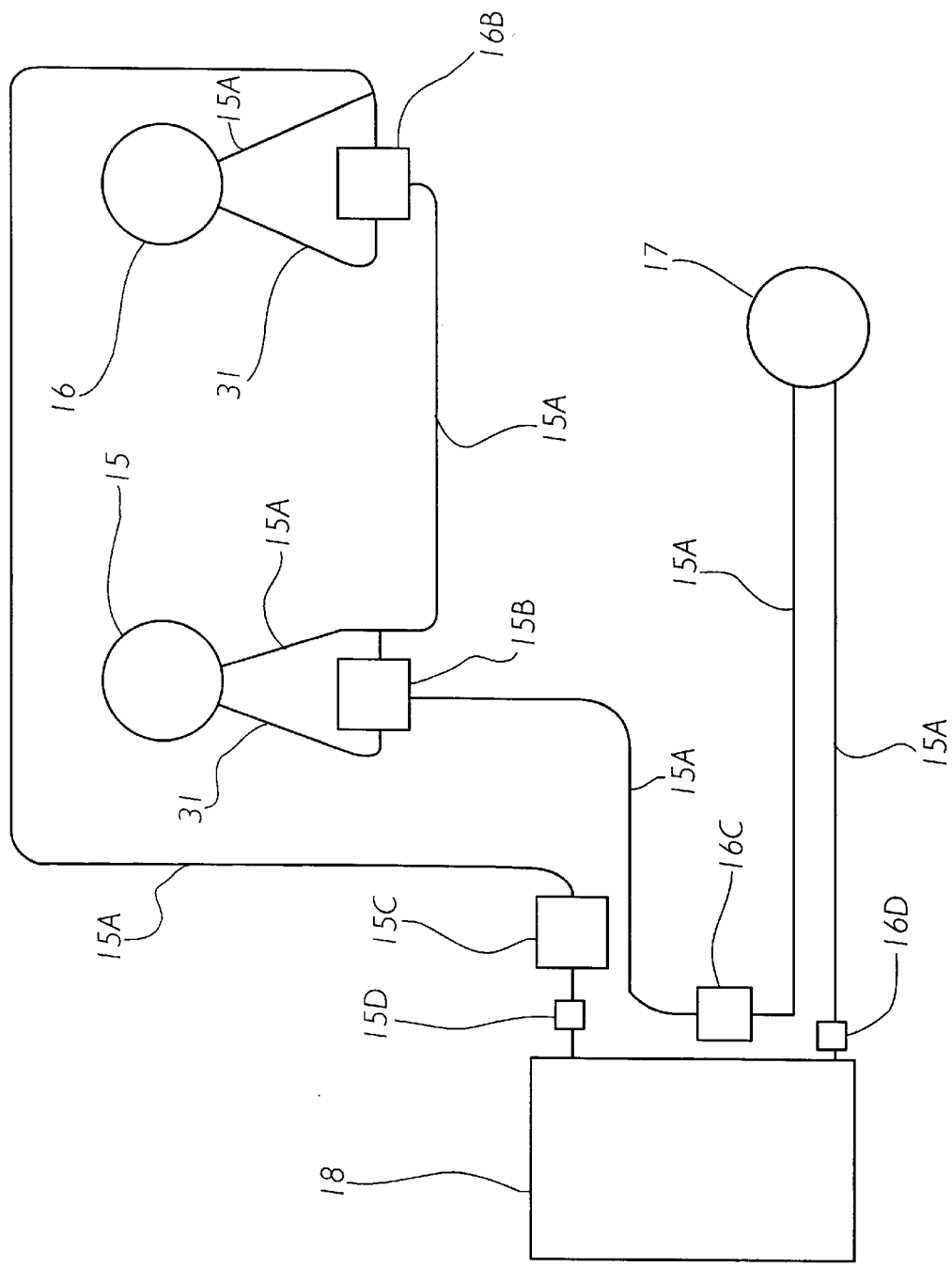
FIG. 3 is a diagram of the rear scrub dual drive means for a sugar beet harvester.

Referring to the drawings in FIGS. 1–3, in particular, the rear scrub dual drive means for a sugar beet harvester includes functionally-independent first and second variable speed actuators 15, 16 preferably hydraulic motors mounted to conventional first and second drive shafts which are supported by and rotatably extend through and between two spaced-apart walls 40A-B of the frame of the conventional rear scrub 40 for a conventional sugar beet harvester.

The hydraulic motors 15,16 are energized by fluid transported to the motors 15, 16 by hoses 15A which are conventionally connected to the motors 15,16. The fluid is received from a reservoir or fluid supply member 18 that is conventionally and securely mounted to the conventional sugar beet harvester. A hose ISA is conventionally connected to a valve member 16D such as a ball valve which is conventionally connected to the fluid supply member 18 and which opens and closes the fluid supply member 18 which is essentially a tank, the hose 15A also being conventionally connected to the inlet of a pump 17 which pumps the fluid from the fluid supply member 18 and which is also conventionally mounted to the sugar beet harvester.

Another hose 15A is conventionally connected to the outlet of the pump 17 and to an inlet of a relief valve 16C which is conventionally connected to the fluid supply member 18 to allow the fluid to re-enter the fluid supply member 18 selectively. A third hose 15A is conventionally connected to an outlet of the relief valve 16C and to a first flow control member 15B. A fourth hose 15A is conventionally connected to the first flow control member 1 5B and to the inlet of a first one of the hydraulic motors 15. A fifth hose 15A is conventionally connected to the outlet of the first one of the hydraulic motors 15 and to a second flow control member 16B which is conventionally connected with a hose 15A to a second one of the hydraulic motors 16. The cycle is completed with a hose 15A being connected to the second one of the hydraulic motors 16 and to a filter member 15C which is connected with another hose 15A to a second valve member 15D such as a ball valve which is connected to the fluid supply member 18 for opening and closing the fluid supply member 18.

To energize the hydraulic motors 15,16, the conventional valve members 15D,16D are opened to allow fluid to flow through the hoses 15A, and the pump 17 is energized to pump the fluid through the hoses 15A through the flow control members 15B,16B and through the hydraulicl 5, 16 and then back to the fluid supply member 18 and so continuously. The fluid energizes the hydraulic motors 15, 16, and the greater the flow the greater the speed of the hydraulic motors 15,16 and the greater the speed of the drive shafts 20A, 20B and the conveyors 30, 31, and the lower the flow the lower the speed of the hydraulic motors 15, 16 and the lower the speed of the drive shafts 20A, 20B and the conveyors 30, 31.

The flow or volume delivered to the hydraulic motors 15,16 is controlled by the flow control members 15B, 16B. The user can simply adjust a conventional adjustable member of a selected flow control member which may include a central processing unit 15B, 16B to either increase the flow or decrease the flow of the fluid through the selected hydraulic motor 15,16 to change the speed of the hydraulic motor 15, 16. The changing of the speeds of the hydraulic motors 15,16 is necessitated by the harvesting conditions and the types of sugar beets being harvested.

The actuators 15,16 are mounted to the drive shafts 20A,20B and supported with brackets which are fastened with conventional means to the frame of the rear scrub 40. The actuators 15, 16, when energized, rotate their respective drive shafts 20A, 20B which in turn move the respective first and second conveyors 30,31 which are carried about sprockets 25A–G mounted to the first and second drive shafts 20A, 20B and mounted to a plurality of rotatable shafts 20C–D which are supported by and extend between the two space-apart walls 40A-B of the frame of the rear scrub 40.

Both the first 30 and second conveyors 31 have front 30A,31A and rear runs 30B, 31B with the runs essentially moving in a vertical direction with the rear run 30B of the first conveyor 30 and the front run 31A of the second conveyor 31 moving in an upward direction and being closely spaced from one another and being capable of receiving and moving sugar beets there between. Both conveyors 30, 31 essentially comprise conventional rigid elongate members 32 laterally aligned and spaced and conventionally linked together to form endless conveyors.

As the sugar beets are picked up by the sugar beet harvester, the sugar beets are moved across cleaning rollers and eventually moved to the rear of the harvester to the rear scrub 40 which scrubs and rolls the sugar beets upwardly out of the top end of the rear scrub 40 and into a receiving member such as the box of a truck. Some of the sugar beets may need more scrubbing, and to effectively accomplish this task, the speeds of the conveyors 30, 31 are varied greatly to one another such that the elongate members 32 of the faster conveyor essentially scrubs, rolls, and cleans the sugar beets while the slower conveyor essentially carries the sugar-beets upwardly to be dispensed out of the harvester.

Another embodiment of the independent variable speed actuators includes using variable speed gas or battery-operated motors mounted to the first and second drive shafts using conventional brackets and fasteners. Any useful actuators which allows the user to readily and easily adjust the speeds independently of one another so that the speeds of the conveyors 30, 31 can be varied relative to one another to effect substantial scrubbing of the sugar beets as they are lifted and transported into a waiting member are highly desirable, since the user doesn't have to remove the chains and remove and replace sprockets and remount the chains about the sprockets in order to effect necessary speed changes and variances with the first and second conveyors, a process of which is currently being used in the art.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A method of cleaning sugar beets using a rear scrub dual drive means for a sugar beet harvester having a first drive shaft and a second drive shaft supported by and extending between spaced-apart walls of a frame and further having a plurality of rotatable shafts and a first conveyor and a second conveyor carried by said plurality of rotatable shafts for scrubbing and conveying sugar beets between a back run of said first conveyor and a front run of said second conveyor, comprising the steps of:
   (a) providing a first variable speed actuator connected to said first drive shaft for rotation thereof and said first conveyor;
   (b) providing a second variable speed actuator connected to said second drive shaft for rotation thereof and said second conveyor, said second variable speed actuator being functional independently of said first variable speed actuator;

(c) providing a means for independently controlling said first variable speed actuator and second variable speed actuator independently of one another so that speeds of said first conveyor and said second conveyor with respect to one another can be adjusted to effect efficient scrubbing of the sugar beets as needed; and (d) actuating said first variable speed actuator and said second variable speed actuator thereby cleaning the sugar beets.

2. The method of cleaning sugar beets as described in claim 1, further comprising the step of:

(e) adjusting the relative speeds of said first conveyor and said second conveyor to operate at different speeds.

3. The method of cleaning sugar beets as described in claim 1, further comprising the step of:

(e) adjusting the relative speeds of said first conveyor and said second conveyor to operate at the same speed.

4. A method of cleaning sugar beets using a rear scrub dual drive means for a sugar beet harvester having a first drive shaft and a second drive shaft supported by and extending between spaced-apart walls of a frame and further having a plurality of rotatable shafts and a first conveyor and a second conveyor carried by said plurality of rotatable shafts for scrubbing and conveying sugar beets between a back run of said first conveyor and a front run of said second conveyor, comprising the steps of:

(a) providing a first variable speed actuator connected to said first drive shaft for rotation thereof and said first conveyor;

(b) providing a second actuator connected to said second drive shaft for rotation thereof and said second conveyor;

(c) providing a means for independently controlling said first variable speed actuator so that the relative speeds of said first conveyor and said second conveyor with respect to one another can be adjusted to effect efficient scrubbing of the sugar beets as needed; and (d) actuating said first variable speed actuator and said second actuator thereby cleaning the sugar beets.

5. The method of cleaning sugar beets as described in claim 4, further comprising the step of:

(e) adjusting the speed of said first conveyor to operate at a different speed with respect to said second conveyor.

6. The method of cleaning sugar beets as described in claim 4, further comprising the step of:

(e) adjusting the speed of said first conveyor to operate at a same speed with respect to said second conveyor.

* * * * *